(12) United States Patent
Yoshikawa

(10) Patent No.: US 7,856,527 B2
(45) Date of Patent: Dec. 21, 2010

(54) RAID SYSTEM AND DATA TRANSFER METHOD IN RAID SYSTEM

(75) Inventor: Hiroto Yoshikawa, Tokyo (JP)

(73) Assignees: Zentek Technology Japan, Inc, Tokyo (JP); D-Broad, Inc., Yokohama-Shi (Kanagawa-Ken) (JP)

( * ) Notice: Subject to any disclaimer, the term of this patent is extended or adjusted under 35 U.S.C. 154(b) by 354 days.

(21) Appl. No.: 11/859,411

(22) Filed: Sep. 21, 2007

(65) Prior Publication Data

US 2008/0301366 A1  Dec. 4, 2008

Related U.S. Application Data

(60) Provisional application No. 60/827,137, filed on Sep. 27, 2006.

(30) Foreign Application Priority Data

Sep. 26, 2006   (JP)   ............... 2006-260303

(51) Int. Cl.
*G06F 13/00*  (2006.01)
(52) U.S. Cl. ............... 711/114; 710/65; 710/301
(58) Field of Classification Search ............... 711/114
See application file for complete search history.

(56) References Cited

U.S. PATENT DOCUMENTS 6,421,760 B1 *   7/2002  McDonald et al. .......... 711/114
2006/0218324 A1 *  9/2006  Zayas ....................... 710/65

FOREIGN PATENT DOCUMENTS

JP   2000-207137   7/2000

* cited by examiner

*Primary Examiner*—Yong Choe
(74) *Attorney, Agent, or Firm*—Lucas & Mercanti, LLP

(57) ABSTRACT

There is provided a novel storage system in which the number of signal lines will not increase even if the number of storage devices to be connected in a RAID system increases, and a novel data transfer method to enable a high-speed data transfer even when the transfer rate of the IDE device side is low. A RAID system (10) which is a storage system in which a RAID controller (11) connected to an ATA host and a plurality of IDE devices (12A to 12D, and 22A to 22D) are connected by an IDE bus, characterized in that at least two or more IDE devices are connected to one channel of the IDE bus and said RAID controller and each of said IDE devices are connected by a common data bus and a common address bus within the same channel.

7 Claims, 6 Drawing Sheets

FIG.5

|  | The Present Invention | | | | Conventional cases | |
|---|---|---|---|---|---|---|
| System configuration | [1] IDE 4 Ch, 4dev/ch | | [2] IDE 2 Ch, 4dev/ch | | [3] IDE 4 Ch, 1dev/ch | |
| Transfer rate | Read | Write | Read | Write | Read | Write |
|  | 100MB/s | 100MB/s | 78MB/s | 70MB/s | 72MB/s | 43MB/s |
| Capacity | 16GB | | 8GB | | 4GB | |
| Number of SD memory ※ | 16 | | 8 | | 4 | |
| Number of all pins | 180 | | 90 | | 108 | |

※ Number of SD memory does not include slave device.

(a)

(b)

RAID SYSTEM AND DATA TRANSFER METHOD IN RAID SYSTEM

BACKGROUND OF THE INVENTION

1. Field of the Invention

The present invention relates to a peripheral device of a computer and more specifically to a RAID system which constitutes a storage system by combining a plurality of storage devices, and a data transfer method in the system.

2. Description of the Related Art

A RAID (Redundant Arrays of Inexpensive Disks) system is known to have several usage modes including one in which a plurality of storage devices having a relatively small memory capacity are combined to be used as a virtual single storage device having a large memory capacity (striping), and one in which the same data are recorded in a plurality of storage devices so as to back up the data (mirroring). Further, there are seven levels from RAID-0 to RAID-6 in terms of the method of parity processing, and the like.

The RAID system is broadly divided into two types based on the follow in methods; a method which utilizes special hardware (hardware-based method) and a method which is implemented by software (software-based method). Out of these, the hardware-based method includes two types: one which utilizes a RAID controller and one which utilizes a disk array unit.

Out of these, the RAID system which utilizes a RAID controller has a configuration in which a plurality of storage devices are connected in parallel to an integrated circuit (chip) called a RAID controller, and is implemented by an arrangement that the RAID controller controls the transfer of data to and from each storage device.

Conventional RAID systems (in particular, one constructed by using a storage device connected to IDE (Integrated Device Electronics) bus) are configured such that one IDE device is connected in parallel to one IDE bus, and a plurality of IDE buses are provided as needed.

On the other hand, storage devices have diversified in recent years, and there have been proposed not only conventional hard disk devices, but also a new memory device called a "silicon disk" which utilizes a semi-conductor memory device such as a flash memory. The basic features of the RAID system such as striping or mirroring, and enhancement of transfer rate can be carried over as they are even when the storage device is changed from a hard disk to a silicon disk. Particularly, a RAID system based on a striping method called a RAID-0 does not complement the redundancy of data, but has gained attention as the system to implement a high speed, large capacity memory device in place of hard disks by utilizing a plurality of memory cards having a small memory capacity (see for example, Japanese Patent Laid-Open No. 2000-207137).

SUMMARY OF THE INVENTION

Problems to be Solved by the Invention

Conventional RAID systems, however, need the same number of IDE buses (which are called "channels") as that of IDE devices to be connected and therefore have a problem in that the number of channels must be increased when a large number of IDE devices are connected. Although 2-channel or 4-channel RAID controllers are commercially available in recent years, they have a drawback in that the number of devices which can be connected is small for the number of the terminals.

FIG. 6(A) shows a configuration example of a conventional RAID system utilizing a 4-channel RAID controller. As shown in the figure, in this system, each of 4-channel. IDE buses 103A to 103D is connected with one IDE device 102A to 102D, and the total of four IDE devices are connected by the four IDE buses.

The IDE bus included in a RAID controller is classified into a data bus, an address bus and a control bus. Out of these, the data bus has 16 bits and therefore 16 signal lines, the address bus has 5 bits and therefore 5 signal lines, and the control bus has 6 bits and therefore 6 signal lines; that is, a total of 27 signal lines constitute one channel of the IDE bus.

Since the system configuration example shown in FIG. 6(A) represents a 4-channel IDE bus, 27 lines×4 channels=108 signal lines are required. Although it is possible, in principle, to connect as many channels as desired, it will become necessary to increase 27 more signal lines every time one additional IDE device is installed as the number of the channels is increased to connect a larger number of IDE devices. For example, to connect 16 IDE devices, a 16-channel IDE bus is required, meaning that the number of signal lines alone amounts to 27 lines×6 channels=432. Moreover, considering the number of terminals of the RAID controller, at least a clock terminal, a reset terminal, and a positive and negative power supply terminals for each bus are required; therefore, taking this into consideration, the number of terminals of a chip will increase even more.

In a conventional RAID controller which is designed as one chip integrated circuit, as the number of channels increases, the required number of terminals (number of pins) of a RAID controller chip will increase, thereby significantly increasing the production costs of the chip and the circuit board.

Further, when a conventional RAID system is utilized to construct a RAID system in which a storage device having a long writing time such as an SD memory card is used, the writing time of the SD memory card will become a large overhead (waiting time) thereby reducing throughput. This is because a conventional RAID system not only physically connects each channel in parallel, but also processes the data transfer in parallel in time.

FIG. 6(B) conceptually shows the writing sequence of data, with devices connected to each channel being 102A to 102D in the configuration example of FIG. 6(A). As shown in the figure, one sector (1 kB) of the 16 kB data transferred from a high-speed ATA (Advanced Technology Attachment) host is allocated to each IDE bus (that is, in such a manner as A1→B1→C1→D1→A2→B2→C2→ . . . ), i.e. written thereinto in a time division manner thereby achieving a speed-up by a parallel processing.

However, when the transfer rate of the ATA host side is sufficiently high while the writing speed of the IDE device side is very low, it will take time to write one sector even when such parallel processing is performed resulting in that the time until the writing of next one sector into the same IDE device is started will become an overhead (waiting time). Increasing the IDE devices to increase the number of parallel processings will cause a problem that the number of required signal lines significantly increases as described above.

The present invention has been made in view of the above described circumstances, and major technical objects thereof are to provide a novel storage system which can effectively suppress the increase of the number of signal lines even when the number of storage devices to be connected increases in a RAID system; and to provide a novel data transfer method which enables a high-speed data transfer even when the transfer rate of the IDE device side is very low.

Means for Solving the Problems

[Physical Configuration]

The RAID system relating to the present invention is a storage system in which a RAID controller connected to an ATA host and a plurality of IDE devices are connected by an IDE bus, wherein at least two or more IDE devices are connected to one channel of the IDE bus and the RAID controller and each of the IDE devices are connected by a common data bus and a common address bus within the same channel. Moreover, although a common data bus and an address bus are used in one channel, as to the control bus, one control bus is required for each IDE device.

This system significantly differs from conventional RAID systems in the following two points.

First, conventional RAID systems are based on a generally accepted premise that the number of IDE device connected to one channel of an IDE bus is always one, while the RAID system relating to the present invention is a system which allows the plurality of IDE devices to be connected to one channel of the IDE bus.

Secondly, in a conventional RAID system, 27 signal lines are required for one device since one IDE device occupies one channel of the IDE bus, but in the RAID system relating to the present invention, the data bus and the address bus are shared in common in each channel.

Thus, since in the RAID system relating to the present invention, the data bus and the address bus are shared in common in one channel, it is possible to effectively suppress the increase in the number of signal lines in the entire system even when the number of IDE devices to be connected increases.

Further, in the RAID system relating to the present invention, the maximum number of devices which can be connected to one RAID controller is determined by the product (m×n) of the number m of channels owned by the RAID controller and the number n of IDE devices to be connected to one channel, and it is possible to increase the number of devices to be connected without significantly increasing the number m of channels. Thus, it is possible to suppress the number of terminals required and the number of signal lines required on the circuit board and thereby to significantly suppress the production cost of RAID controller chips and the design and production costs of the circuit board.

However, when two of a master device and a slave device can be connected to one IDE device, the number N of storage devices to be connected to one RAID system relating to the present invention will be N=2×(m×n).

Further, in the present specification, "IDE devices of the same channel" means that they share a data bus and an address bus in common and, in particular, a plurality of IDE devices which are connected to the same channel are generally referred to as "IDE devices belonging to the same group".

Further, the above described RAID controller may be made up of a FPGA (Field Programmable Gate Array). Moreover, the above described storage device preferably includes a semiconductor memory device having a flash memory. This is because a flash memory is one of the storage devices of which writing speed is very low compared with the transfer rate of ATA and for which a significant effect is expected by applying the present invention.

Further, it is preferable that the above described IDE device is an SD host controller having a protocol conversion engine between ATA and SD and the above described storage device is an SD memory card. This is because, although an SD memory card as it is cannot communicate with an ATA host, when a protocol conversion between ATA and SD is performed on the host controller side of the SD memory card, the SD host controller will be recognized as a direct IDE device for the RAID controller.

Preferably, the above described SD host controller each comprises: two systems of SD host cores, each of which includes an SD host engine, a group of host registers for controlling the SD host engine, and memory; and two systems of selectors. Since the ATA host can recognize two of the master device and the slave device, when the SD host controller is provided with such a configuration, two SD memory cards can be inserted thereinto with one being recognized as the master device and the other as the slave device. Moreover, the SD host controller may be an SDIO controller which is upper compatible thereof.

Moreover, the above described RAID system is preferably a RAID system based on a striping method (RAID Level zero). This is because such a configuration will make it possible to realize a single high-speed and large capacity storage device by using a plurality of memory cards having a small memory capacity.

Further, it is preferable that utilizing the writing delay time of a storage device connected to each channel is utilized to perform a sequential writing operation into the other storage devices in the same group, in which the above described data bus and the address bus are shared in common.

[Data Transfer Method]

Being premised on the physical configuration of the above described RAID system relating to the present invention, the data transfer method in the RAID system relating to the present invention is characterized by comprising the following steps:

(step 1) in which data received from the host by the above described RAID controller are divided into a plurality of successive data and thereafter sequential data are transferred to each IDE bus (channel); and (step 2) in which the received data are sequentially written by each IDE device, which belongs to each group and which receives the above described divided data, into each storage device belonging to the same group.

Moreover, the step 2 is performed independently for each IDE device.

In the RAID system relating to the present invention, adopting such data transfer method described above enables data transfer at a very high speed even though many devices are connected, since, even when a plurality of storage devices having a very low writing speed are connected in the same channel, writing into one storage device is performed while sequential writing into other storage devices in the same channel is performed, and these writing operations are independently performed for different channels. Furthermore, since as described above, devices in the same group use a common data bus and an address bus, even when the number of devices increases in the same group, the signal line to be increased is that for the control bus alone.

In particular, in the above described step 2, the step in which received data are written into each storage device belonging to the same group is preferably characterized by comprising: a step in which received data are divided into a plurality of packets in advance; and a step in which writing into the above described storage device is performed multiple times with the above described packet being as unit. This is because some of recent SD memory cards have a buffer for writing or reading (W/R-FIFO) and, in those cases, it is possible to further increase the transfer rate by performing writing (or reading) at multiple times by dividing received data into packets and retaining them in the above describe buffer.

ADVANTAGES OF THE INVENTION

Since the RAID system relating to the present invention is configured such that a data bus and an address bus are shared in common in the same channel, the number of signal lines which is to be increased to add one IDE device in the same channel is only six for connecting the control signal, and thus it is possible to significantly reduce the number of signal lines and the number of terminals of the RAID controller as a whole.

Further, when the above described data transfer method is adopted to the configuration of the RAID system relating to the present invention, during the writing delay time (busy time) included in each of the plurality of the storage devices connected to one channel, the writing into another storage device connected to the same channel is performed, and therefore the system will not be limited by the writing delay time of the storage device. This will make it possible to increase throughput.

Particularly, when adopted to an SD memory card, it is possible to significantly increase throughput by effectively utilizing the writing delay time specific to the SD memory card.

BRIEF DESCRIPTION OF THE DRAWINGS

FIG. 5 is a table to compare the RAID system relating to the present invention with a conventional RAID system;

Figure 1:
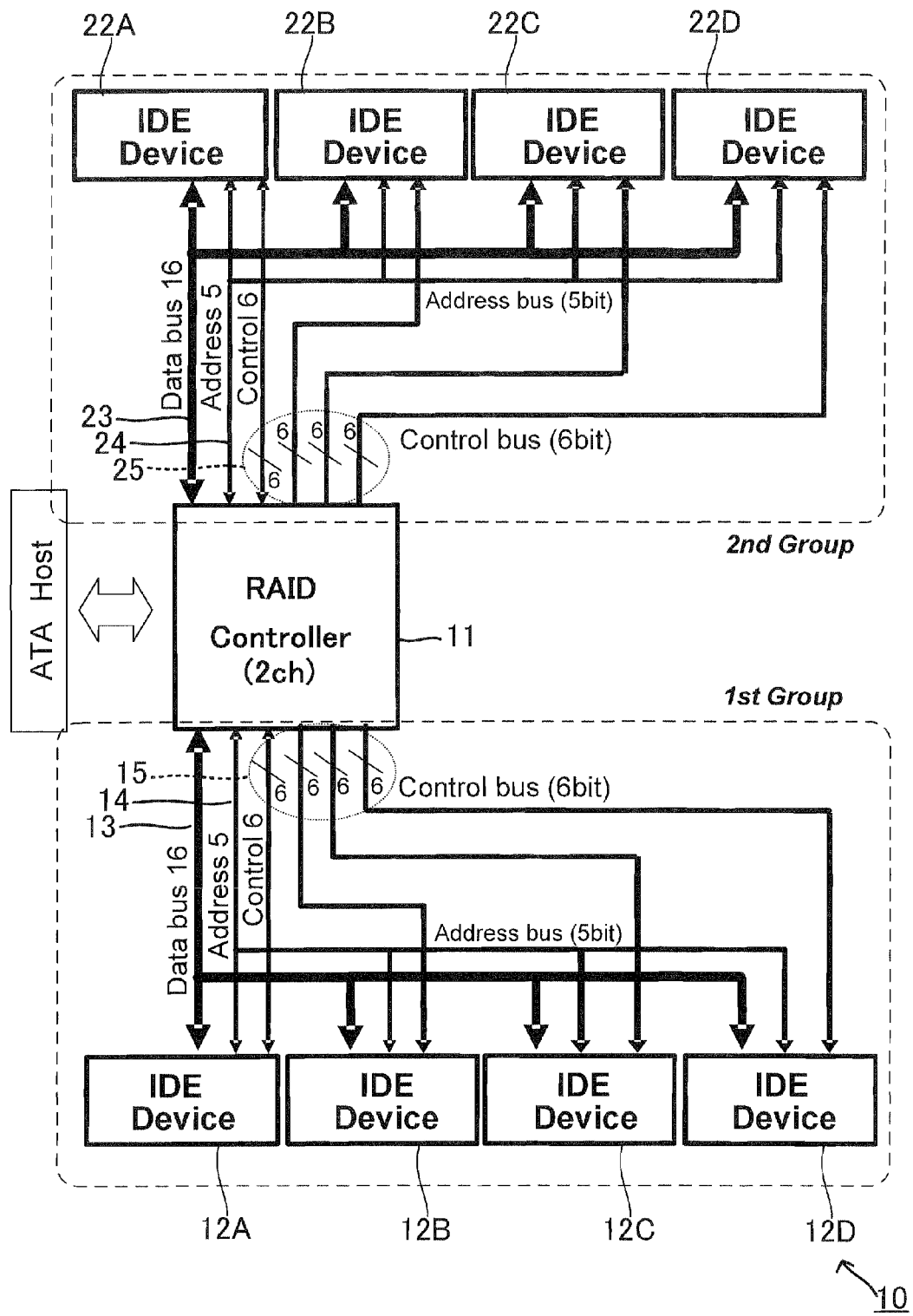
FIG. 1 shows a connection example of the RAID system relating to the present invention.

DESCRIPTION OF SYMBOLS 10, 40 RAID system
11 RAID controller
12, 22 IDE device
13, 23 Data bus
14, 24 Address bus
15, 25 Control bus
30 SD host controller (SDIO host controller)
34 SD host core

DETAILED DESCRIPTION OF THE PREFERRED EMBODIMENTS

First Embodiment

—System Configuration—

First, the basic configurations of the RAID system relating to the present invention will be described.

FIG. 1 shows a connection example of the RAID system relating to the present invention. The system 10 shown is a RAID system made up of a 2-channel RAID controller 11, in which a plurality (four) of IDE devices 12A to 12D are connected to a first channel, and a plurality (four) of IDE devices 22A to 22D to a second channel, with eight IDE devices in total being connected thereto.

The IDE devices 12A to 12D are respectively connected by a common data bus 13 and a common address bus 14 (these are conveniently referred to as "IDE devices belonging to a first group"). Similarly, the IDE devices 22A to 22D are connected by a common data bus 23 and a common address bus 24 ("IDE devices belonging to a second group"). Thus, such a configuration that "a plurality of devices are connected to the same channel by providing a common data bus and a common address bus" is one of the physical features of the present invention.

Moreover, the control bus 15 (25) to be connected to IDE devices belonging to each group is made tip of a separate bus.

—Number of Signal Lines—

As shown in the figure, being premised on the current specification of the ATA interface, the address bus has 16 bits, the data bus has 5 bits, and the control bus has 6 bits for one IDE device. Therefore, when the data bus and the control bus are shared in common, the number of signal lines required will be [(16+5)+6×n] per one channel. Therefore, when the number of channels is m, the number X of signal lines required is calculated as follows:

$$X=[\{(16+5)+6 \times n\} \times m] \tag{1}$$

Since the number m of channels of the RAID controller shown in FIG. 1 is two, and the number n of IDE devices per one channel is four, a total of eight (2×4) IDE devices are connected, and thus the number of signal lines will be {(16+5)+6×4}×2=90.

Comparative Example

Since a conventional RAID system is equipped with only one device per one channel, to connect eight IDE devices as shown in FIG. 1, a 8-channel RAID system is required and since each channel is to be connected in parallel, the required number of signal lines will be 27×8=216.

Connection Example

In the RAID system 10 shown in FIG. 1, the IDE devices 12A to 12D and 22A to 22D are to be connected with storage devices not shown. As the storage device, although a hard disk with an IDE connection may be connected, description will be made herein on an example in which an SD memory card is connected.

A SD host controller comprising a protocol conversion engine between ATA and SD has already been invented by the present inventors. Such an SD host controller is directly recognized without via driver software or firmware as an IDE device to a RAID controller. Therefore, using an SD host controller having a protocol conversion engine between ATA and SD will make it possible to readily realize a RAID system by regarding one SD memory card as a storage device in place of one hard disk drive.

Figure 2:
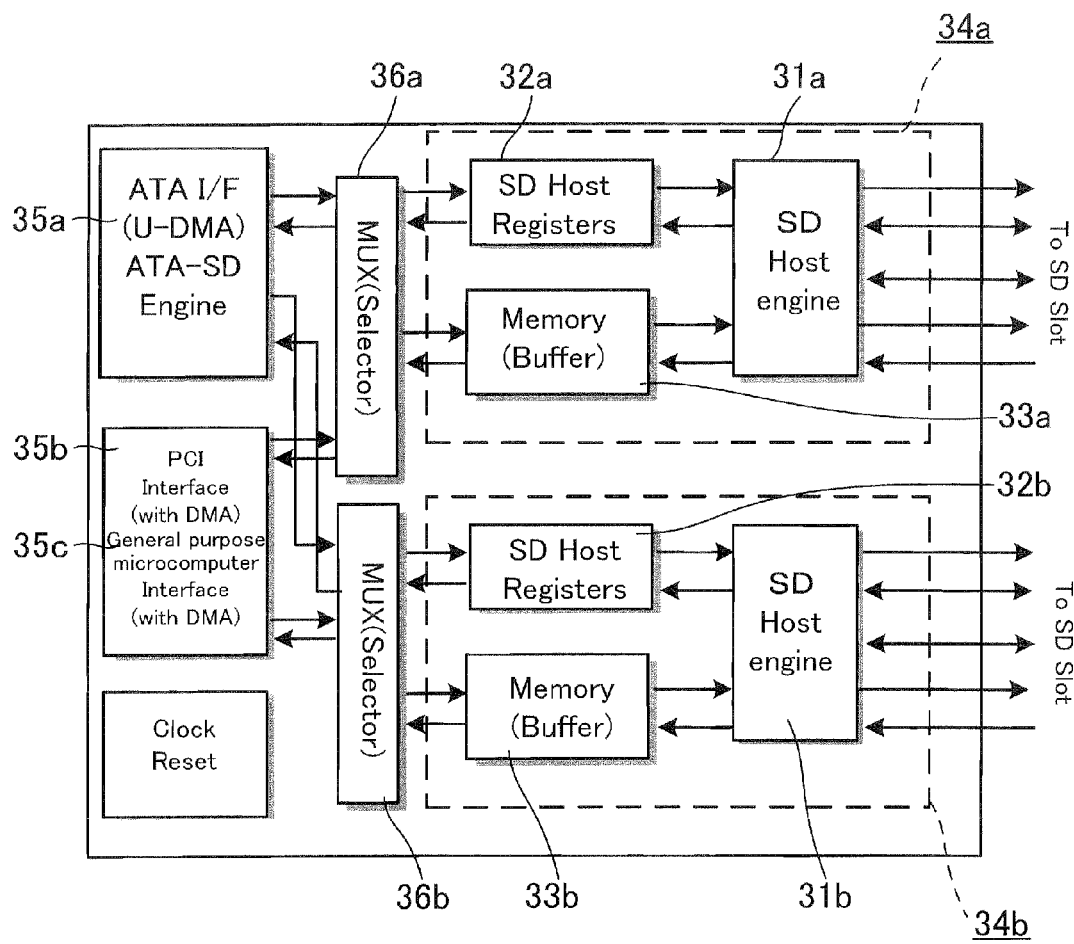
FIG. 2 shows the function blocks of the SD(IO) host controller equipped with an ATA interface and an ATA-SD protocol conversion engine.

FIG. 2 shows a function block of an SD(IO) host controller equipped with an ATA interface and an ATA-SD protocol conversion engine (see PCT/JP2005/0171682 and FIG. 1). This SD host controller (SDIO host controller) 30 is a one-chip semiconductor device comprising: two systems of SD host cores 34 (the like numerals are used to indicate the like functional blocks and subscripts a, b are used to distinguish them), each of which includes an SD protocol engine of the SD host (SD host engine 31), a group of SD host registers 32 for controlling the SD host engine, and memory (SRAM etc) 33; three CPU interfaces (an ATA interface 35a, a PCI interface 35b, and a general purpose microcomputer inter face 35c) for controlling the SD host; and selectors for selecting each CPU interface (MUX 36a, 36b). This product is already commercially available by C-guys Inc. as the trade name, [CG-200] (http://www.c-guys.jp/CG200_index_jp.htm). The actual product and the invention according to the above described publication can function not only as a host controller of the SD memory but also as an SDIO host controller which is an upper compatible thereof; however, when the devices to be connected are SD memories as with the case of the present invention, the SD host controller will be satisfactory since the number of commands which are recognized by the host is small, and there is no need of various commands for realizing I/O functions.

Further, typically two of a normal master device and a slave device may be connected to ATA as storage devices, and the ATA host has a protocol to distinguish the master from the slave. Many of commercially available SD host controllers have only one slot, to equip an SD memory card; however, the SD host controller shown in FIG. 2 includes two systems of SD host cores 34, and therefore includes two slots for inserting the SD memory card thereinto; it is possible to control one of them to be a master device and the other to be a slave device from the host side of the ATA. And the selection of the master and host devices is such that when one bit (called as DEVBIT) in the register DEVHED for performing device selection is 0, writing or reading is performed into or from the master device, and into or from the slave device when the bit is 1. In this occasion, since the only difference between the two is the difference in the address to write into or read from, introducing a slave device can increase the capacity of one IDE device without changing the speed thereof, from the viewpoint of the RAID system.

Thus, in the RAID system shown in FIG. 1, since connecting the SD host controller shown in FIG. 2 as the IDE device allows two SD memory cards to be connected to one IDE device, it is possible to connect a total of up to 16 SD memory cards with eight SD host controllers. For example, by inserting 16 SD memory cards of 1 GB and striping them, a storage system in total of 16 GB will be realized. Alternatively, it is also possible to perform mirroring of some of respective SD memory cards depending on the level of the RAID system, and to use each SD memory card as an independent storage device. Further, applying the data transfer method described below will significantly improve the writing and reading speeds.

Second Embodiment

Figure 3:
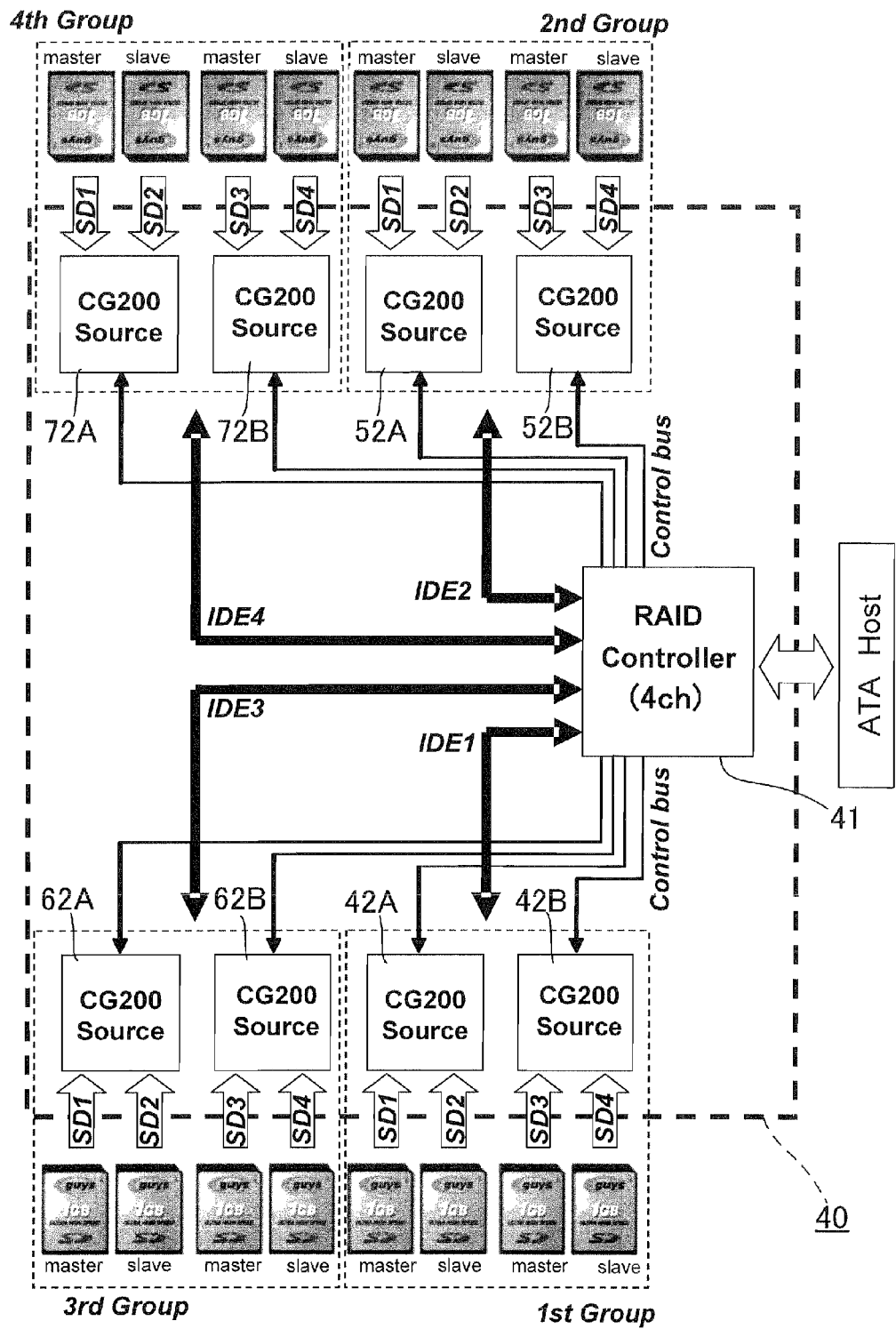
FIG. 3 is a system configuration diagram to illustrate a second embodiment.

FIG. 3 shows a system configuration diagram to illustrate a second embodiment. In this RAID system 40, each channel of the 4-channel RAID controller 41 is connected with two SD host controllers 42A and 42B, 52A and 52B, 62A and 62B, and 72A and 72B, which are recognized as an IDE device, respectively. Further, since this system is a storage system implemented by an SD memory and a RAID controller, this is herein designated as a "SDMD: Secure Digital Memory Drive" system.

As described in the first embodiment, since each channel is configured to share a data bus and an address bus in common, the number of signal lines required may be determined from calculation by substituting m=4 and n=2 into the above described equation (1) obtaining:

$$X=[\{(16+5)+6\times 2\}\times 4]=132 \tag{1'}$$

With regard to the number of terminals of a RAID controller, since power supply terminals, clock terminals, reset terminals etc are required, these must be added thereto; however, considering a case in which eight IDE devices are connected in parallel as with conventional cases thereby requiring 27×8=216 signal lines, it will be understood that the number of terminals required is significantly reduced in the system relating to the present embodiment.

On the other hand, each of SD host controllers 42, 52, 62, 72 can be inserted with two SD memory cards (one for a master device and one for a slave device). After all, as shown in FIG. 3, this SDMD system is configured such that 4×2×2=16 SD memory cards can be inserted.

Moreover, in such a multi-channel RAID system, a sum total of the capacity of storage devices connected to each channel must be the same; however, there is no problem even if the master and the slave in, an IDE device are different in capacity.

—Distinctive Feature of SD Memory Card—

Next, a data transfer method suitable for a system relating to the present invention will be described. In a conventional RAID system, only one IDE device is connected to one channel, and when a plurality of IDE devices are connected, the number m of channels are increased; however, in the system relating to the present invention, a plurality of devices are connected to one channel sharing a data bus and an address bus in common. Therefore, though the data transfer method must be described, first, the features (distinctive features compared with a hard disk drive) of an SD memory card will be described.

A SD memory card, which is a kind of storage device, is said to take more time for writing operation compared with other storage devices such as a hard disk drive. This reason will be described below.

The writing operation in an SD memory card is broadly made up of following steps.

(1) step in which the SD host controller sends writing command (CMD25) to the controller of the SD memory card;

(2) step in which the controller of the SD memory card returns a command response;

(3) step in which the SD controller sends data packets to the controller of the SD memory card following the command response; and (4) step in which writing is started (it becomes busy time while writing is performed).

Since, in an SD memory card, the write processing is performed in the steps described above, it takes much time in writing. On the other hand, an ATA host side, which is the host side of the RAID system (including a serial ATA having a higher speed, ATA2 which is a next generation ATA, and the like), has a sufficient speed compared with the storage devices connected to the RAID controller, the writing speed from the host side to the RAID system side is limited by the writing time of each storage device in such a manner as that sequential writing is performed for each channel in the configuration in which storage devices are connected one by one in parallel as in a conventional method.

Then, the data transfer method relating to the present invention is configured such that a plurality of storage devices having a low writing speed are connected to one channel, and while writing is performed into one device, sequential wiring is performed to other devices belonging to the same group. In other words, utilizing writing delay times of a storage device connected to each channel, sequential writing operation is performed into other storage devices belonging to the same group in which the above described data bus and the address bus are shared in common.

Figure 4:
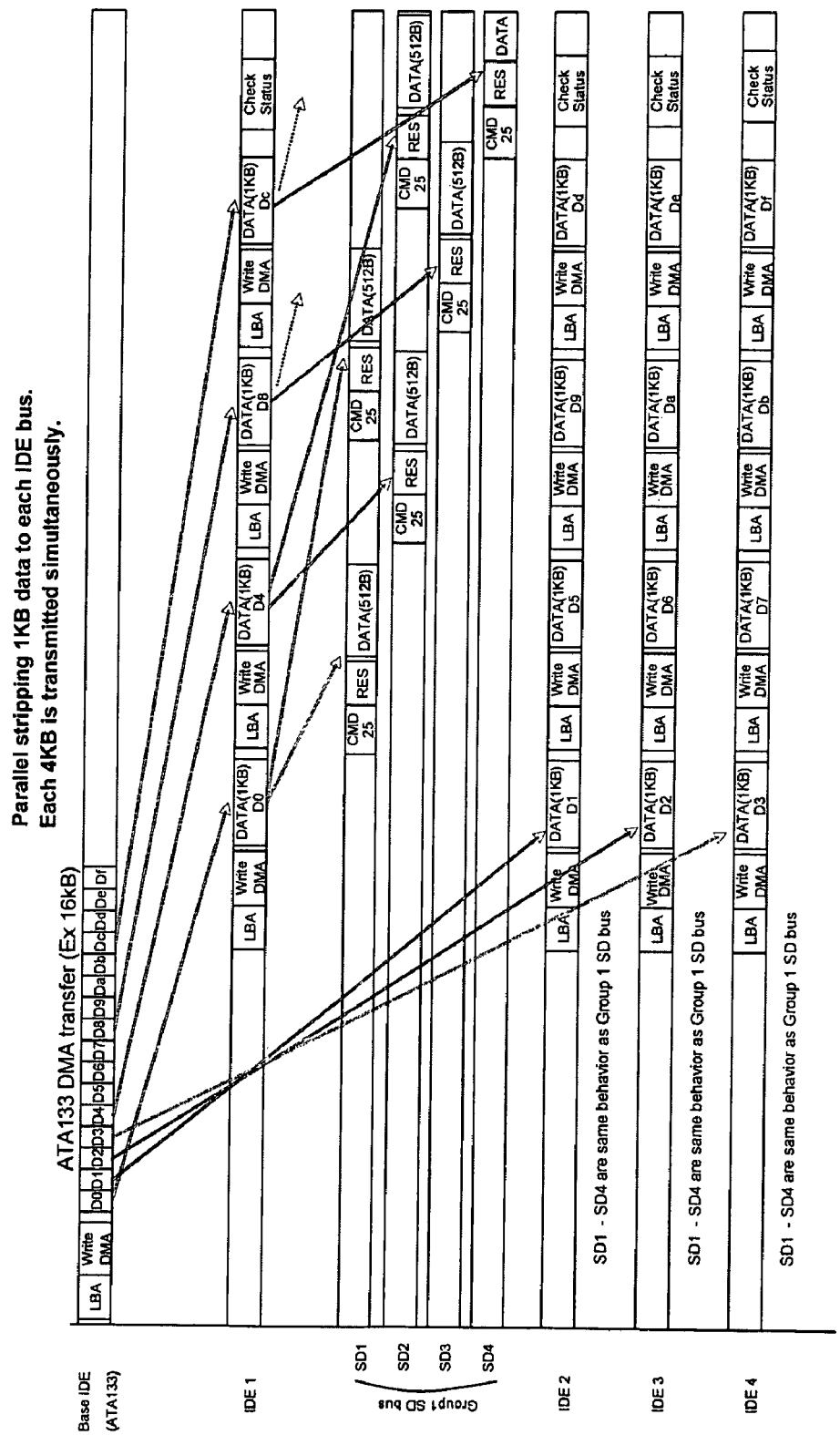
FIG. 4 illustrates the data transfer method of the RAID system relating to the present invention.
Figure 6:
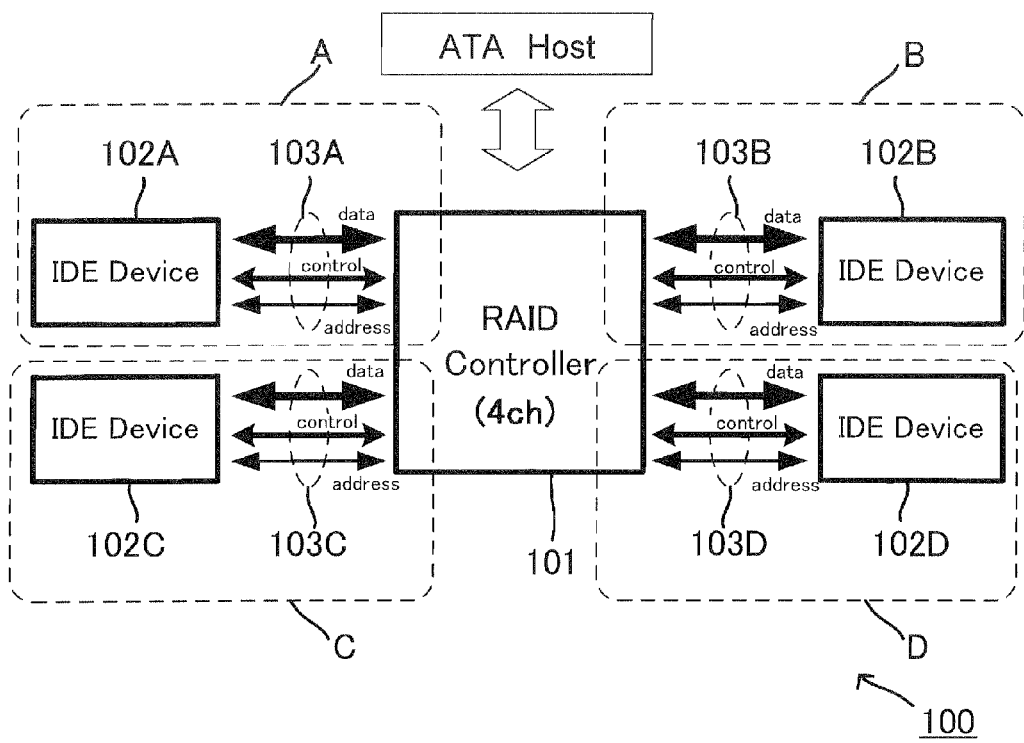
FIG. 6(A) shows a configuration example of a conventional RAID system which utilizes a 4-channel RAID controller.
FIG. 6(B) conceptually shows the data writing sequence with the devices connected to each channel being devices A to D in the configuration example of FIG. 6(A).
Figure 6:
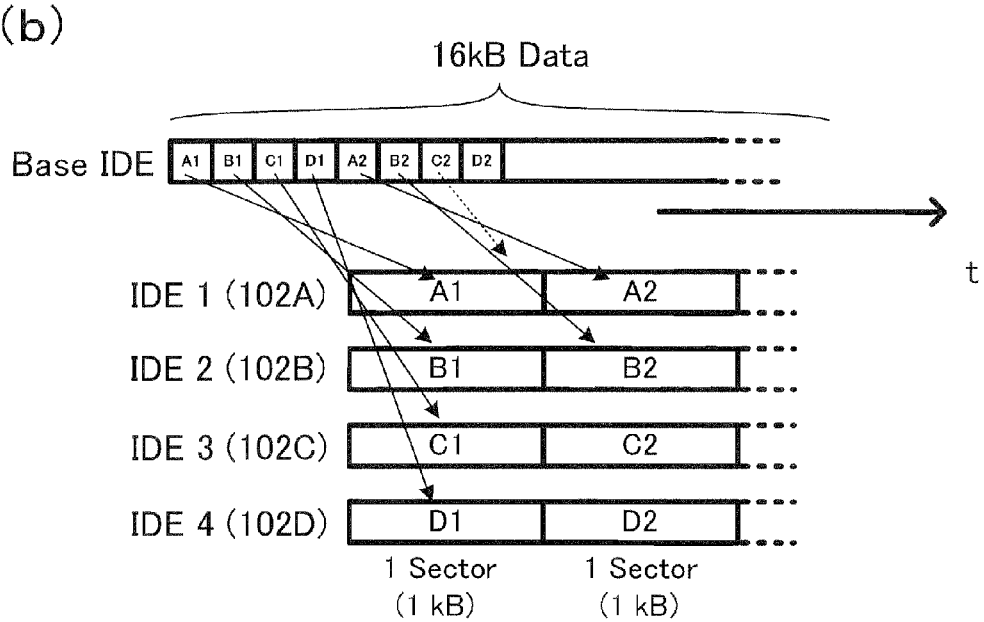

FIG. 4 illustrates the data transfer method in a configuration (illustration of the physical configuration is omitted) in which the number n of IDE devices per one channel is expanded to four by expanding the physical configurations of the RAID system shown in FIG. 3.

To simplify the description, no slave device is connected to the IDE device and only master devices are connected (the total number of the SD memory cards is 16). Further, if shave devices are connected, twice as many, that is, 32 of the SD memory cards can be inserted; however, the data transfer rate is unchanged for the case in which there are master devices alone. This is because the difference between the master device and the slave device is that in the addresses for writing or reading, and introducing slave devices will increase the capacity of one IDE device, but will not change the transfer rate itself from the viewpoint of the RAID system.

Moreover, the step described below is to describe the data transfer (writing) procedure from an ATA host side to an SD memory card. And, on the contrary, since the data transfer from the SD memory card to the ATA host side can basically be considered to be a reversed operation, only the results will be shown omitting detailed description in FIG. 5 described below.

Hereinafter, a concrete example of the data transfer method relating to the present invention will be described with reference to FIG. 4.

—Data Transfer Method—

(Step 1) The RAID controller divides the 16 kB data received from the host into successive 1 kB data D0 to Df, and sends sequential data to each IDE bus (channel). Since the processing in each IDE bus can be performed by each IDE device independently, the processings (2, 3, 4) described below are performed in parallel independently for each group. This means that the time when the step 2 ends and the time when the step 3 and step 4 end are approximately the same.

(Step 2) Writing into Each Storage Device Belonging to a First Group (2-1) Writing into the Storage Device Connected to the First IDE Device A first IDE device belonging to the first group, which has received 1 kB data D0, divides the received data into two 512 Byte packets and first writes the first packet into a storage device connected to the above described first IDE device, and then writes the remaining packet after finishing the writing of the first packet.

(2-2) Writing into the Storage Device Connected to the Second IDE Device

Next, while the writing of the first packet into the storage device connected to the above described first IDE device is performed, a second IDE device, which has newly received next 1 kB data D0 which made a circle of the IDE bus from the host, divides the received data into two 512 Byte packets and then writes the first packet to the storage device connected to the above described second IDE device and writes the remaining packet after finishing the writing of the first packet.

(2-3) Writing into the Storage Device Connected to the Third IDE Device

Next, while the writing of the first packet into the storage device connected to the above described second IDE device is performed, a third IDE device, which has newly received next 1 kB data D8 which made a circle of the IDE bus from the host, divides the received data into two 512 Byte packets and then writes the first packet into the storage device connected to the above described third IDE device belonging to the same group and writes the remaining packet after finishing the writing of the first packet.

(2-4) Writing into the Storage Device Connected to the Fourth IDE Device

Next, while the writing of the first packet into the storage device connected to the above described third IDE device is performed, a fourth IDE device, which has newly received next 1 kB data D8 which made a circle of the IDE bus from the host, divides the received data into two 512 Byte packets and then writes the first packet into the storage device connected to the above described fourth IDE device belonging to the same group and writes the remaining packet after finishing the writing of the first packet.

(Step 3) Writing into Each Storage Device Belonging to the Second Group

Independent of the writing into the storage device belonging to the first group, writing into each storage device of the second group is performed through the following steps (3-1) to (3-4).

(3-1) Writing into the Storage Device Connected to the First IDE Device

A first IDE device belonging to the second group, which has received 1 kB data D1, divides the received data into two 512 Byte packets, and first writes the first packet into the storage device connected to the above described first IDE device, and next writes the remaining packet after finishing the writing of the first packet.

(3-2) Writing into the Storage Device Connected to the Second IDE Device

Next, while the writing of the first packet into the storage device connected to the above described first IDE device is performed, a second IDE device, which has newly received next 1 kB data D5 which made a circle of the IDE bus from the host, divides the received data it two 512 Byte packets and then writes the first packet to the storage device connected to the above described second IDE device and writes the remaining packet after finishing the writing of the first packet.

(3-3) Writing into the Storage Device Connected to the Third IDE Device

Next, while the writing of the first packet into the storage device connected to the above described second IDE device is performed, a third IDE device, which has newly received next 1 kB data 139 which made a circle of the IDE bus from the host, divides the received data into two 512 Byte packets and then writes the first packet into the storage device connected to the above described third IDE device and writes the remaining packet after finishing the writing of the first packet.

(3-4) Writing into the Storage Device Connected to the Fourth IDE Device

Next, while the writing of the first packet into the storage device connected to the above described third IDE device is performed, a fourth IDE device, which has newly received next 1 kB data Dd which made a circle of the IDE bus from the host, divides the received data into two 512 Byte packets and then writes the first packet into the storage device connected to the above described fourth IDE device and writes the remaining packet after finishing the writing of the first packet.

(Step 4) Writing into Each Storage Device Belonging to the Third Group

Independent of the writing into each storage device of the first and second groups described above, writing into each storage device of the third group is performed through the following steps (4-1) to (4-4).

(4-1) Writing into the Storage Device Connected to the First IDE Device

A first IDE device belonging to the third group, which has received 1 kB data D2, divides the received data into two 512 Byte packets and first writes the first packet into the storage device connected to the above described first IDE device, and next writes the remaining packet after finishing the writing of the first packet.

(4-2) Writing into the Storage Device Connected to the Second IDE Device

Next, while the writing of the first packet into the storage device connected to the above described first IDE device is performed, a second IDE device, which has newly received next 1 kB data D6 which made a circle of the IDE bus from the host, divides the received data into two 512 Byte packets and then writes the first packet to the storage device connected to the above described second IDE device and writes the remaining packet after finishing the writing of the first packet.

(4-3) Writing into the Storage Device Connected to the Third IDE Device

Next, while the writing of the first packet into the storage device connected to the above described second IDE device is performed, a third IDE device, which has newly received next 1 kB data D10 which made a circle of the IDE bus from the host, divides the received data into two 512 Byte packets and then writes the first packet into the storage device connected to the above described third IDE device belonging to the same group and writes the remaining packet after finishing the writing of the first packet.

(4-4) Writing into the Storage Device Connected to the Fourth IDE Device

Next, while the writing of the first packet into the storage device connected to the above described third IDE device is performed, the third IDE device, which has newly received next 1 kB data De which made a circle of the IDE bus from the host, divides the received data into two 512 Byte packets and then writes the first packet into the storage device connected to the above described fourth IDE device and writes the remaining packet after finishing the writing of the first packet.

(Step 5) Writing into Each Storage Device Belonging to the Fourth Group

Independent of the writing into the storage device belonging to the first to third groups, the writing into each storage device of the fourth group is performed through the following steps (5-1) to (5-4).

(5-1) Writing into the Storage Device Connected to the First IDE Device

A first IDE device belonging to the fourth group, which has received 1 kB data D3, divides the received data into two 512 Byte packets and first writes the first packet into the storage device connected to the above described first IDE device, and next writes the remaining packet after finishing the writing of the first packet.

(5-2) Writing into the Storage Device Connected to the Second IDE Device

Next, while the writing of the first packet into the storage device connected to the above described first IDE device is performed, a second IDE device, which has newly received next 1 kB data D7 which made a circle of the IDE bus from the host, divides the received data into two 512 Byte packets and then writes the first packet to the storage device connected to the above described second IDE device and writes the remaining packet after finishing the writing of the first packet.

(5-3) Writing into the Storage Device Connected to the Third IDE Device

Next, while the writing of the first packet into the storage device connected to the above described second IDE device is performed, a third IDE device, which has newly received next 1 kB data D11 which made a circle of the IDE bus from the host, divides the received data into two 512 Byte packets and then writes the first packet into the storage device connected to the above described third IDE device belonging to the same group and writes the remaining packet after finishing the writing of the first packet.

(5-4) Writing into the Storage Device Connected to the Fourth IDE Device

Next, while the writing of the first packet into the storage device connected to the above described third IDE device is performed, a fourth IDE device, which has newly received next 1 kB data Df which made a circle of the IDE bus from the host, divides the received data into two 512 Byte packets and then writes the first packet into the storage device connected to the above described fourth IDE device and writes the remaining packet after finishing the writing of the first packet.

The most important thing in this data transfer method is that operations in each step are such that although write processing is sequentially performed for a plurality of storage devices, each of steps 1 to 4 is performed independently. This means that at the time when writing into all the devices for the first group is finished, writing into the last storage device belonging to the fourth group has been finished.

Further, as a further improvement, some of recent SD memory cards are equipped with a buffer for writing or reading (W/R-FIFO) (for example, National Publication of International Patent Application No. 2004-077306). In such a case, when writing 1 kB data into an SD memory card, it is possible to shorten the write processing time by making the data size smaller, as well as to further increase the writing speed by dividing the data into the buffer size (or a smaller size than that). In the above described example, the reason why 1 kB data is divided into two 512 Byte packets is that the size of the buffer of the SD memory card is assumed to be 512 Byte. Therefore, when a larger buffer is equipped, it is possible to perform efficient write processing by dividing the data into packets smaller than the buffer size.

Moreover, connecting a plurality of devices by connecting a data bus and an address bus in common can be realized by using a conventional RAID controller since that is a matter of implementation of the circuit board; however the above described data transfer method cannot be realized in the same manner, which can be realized with relative ease by using a FPGA (Field Programmable Gate Array) and the like.

The inventors of the present invention have designed a RAID controller to realize the above described data transfer method by using a FPGA and investigated the transfer rate thereof in reality.

FIG. 5 is a table to show the results of comparison of the transfer rate, the capacity, the number of SD memory cards connected, and the total number of signal lines in the below described cases [1] to [3] in which the RAID system relating to the present invention is compared with a conventional RAID system, in a configuration in which an SD host controller having a protocol conversion engine between ATA and SD as shown in FIG. 2 is connected, and an SD memory card is used as the above described storage device. In the figure, symbol m represents the number of channels of IDE, and symbol n represents the number of devices per one channel, respectively.

Case [1] (m,n)=(4,4) [the present invention]
Case [2] (m,n)=(2,4) [the present invention]
Case [3] (m,n)=(4,1) [conventional art]

The cases [1] and [2] show the result of the case in which the transfer method relating to the present invention has been applied. The case [1] shows the result of the case in which the number of devices to be connected to one channel is four in a 4-channel RAID system relating to the present invention. The case [3] shows the result of the case of a conventional 4-channel RAID system (the number of devices to be connected to one channel is one).

Since slave devices do not affect the transfer rate, the number of SD memory cards represents the number of master devices alone. Further, every SD memory card used has a capacity of 1 GB for each. Although the number of SD memory cards will be doubled when slave devices are connected, the transfer rate will not be affected as described above.

The results of the cases [1] to [3] show that in the RAID system relating to the present invention, there is substantially no increase in the number of signal lines even when the memory capacity becomes four times or twice of that of a conventional system indicating that the RAID system relating to the present invention has d very high implementation efficiency. This will be made apparent by calculating the number of signal lines required (27×16=432) to connect 16 IDE devices in a conventional RAID system.

Further, it is made clear that in a conventional RAID system of IDE 4-channel (case [3]), the transfer rate was 72 MB/sec in writing and 43 MB/sec in reading while in the RAID system relating to the present invention, the transfer rate was increased both in reading and writing. Particularly, the increase in the writing speed is remarkable. Moreover, in the case [1], the reason why the reading and writing speeds both became MB/sec is considered that they were saturated at the upper limit of the transfer rate of the (first generation) serial ATA. Therefore, by changing it to next generation serial ATA2 (S-ATA2), it will be possible to achieve at least 140 MB/sec.

Further, even if the total number (n×m) of IDE devices to be connected is the same, depending on the setting of individual values of n and m, there are optimum values to maximize the transfer rate as a whole.

INDUSTRIAL APPLICABILITY

According to the RAID system and the data transfer method thereof relating to the present invention, it is possible to significantly increase the data transfer rate without increasing the number of signal lines more than that in the conventional art. In particular, by combining a plurality of storage devices having a low writing speed, not only the memory capacity is increases, but also the writing speed as a whole remarkably increases.

In particular, applying an SD memory card as the storage device will make it possible to construct an IDE-RAID system having an extra-high speed and a large capacity by utilizing inexpensive SD memory cards. Therefore, the present invention has an excellent industrial applicability.

What is claimed is:

1. A RAID (Redundant Arrays of Inexpensive Disks) system, comprising:
a storage system in which a RAID controller connected to an ATA (Advanced Technology Attachment) host and a plurality of IDE (Integrated Drive Electronics) devices are connected by an IDE bus, wherein at least two or more IDE devices are connected to one channel of the IDE bus, and said RAID controller and each of said IDE devices are connected by a common data bus and a common address bus within said one channel, wherein each of said IDE devices is an SD (Secure Digital) host controller having a protocol conversion engine between ATA and SD, and, wherein each of said IDE devices is connected to a storage device which is an SD memory card, and said SD host controller comprises two systems of SDIO (Secure Digital Input Output) host cores, each of which includes an SD host engine, a group of host registers for controlling the SD host engine, and memory, and two systems of selectors.

2. The RAID system according to claim 1, wherein said RAID controller comprises a FPGA (Field Programmable Gate Array).

3. The RAID system according to claim 1, wherein said storage device comprises a semiconductor memory device having a flash memory.

4. The RAID system according to claim 1, wherein said RAID system is a RAID system based on a striping method (RAID level zero).

5. The RAID system according to claim 1, wherein writing delay time of a storage device connected to each channel is utilized to perform sequential writing operation to other storage devices of the same group in which said data bus and address bus are shared in common.

6. A data transfer method in the RAID system according to claim 1, comprising:
(step 1) in which data received from the host by said RAID controller are divided into a plurality of successive data and thereafter data are sequentially transferred to each IDE bus (channel); and
(step 2) in which the received data are sequentially written by each IDE device, which belongs to each group and which receives said divided data, into each storage device belonging to the same group.

7. The data transfer method according to claim 6, wherein in said step 2, the step in which the received data are written into each storage device belonging to the same group comprises a step in which the received data are divided into a plurality of packets in advance and a step in which the data are written into said storage device at a plurality of times with said packet as unit.

* * * * *